(12) United States Patent
Suzuki

(10) Patent No.: US 9,634,336 B2
(45) Date of Patent: Apr. 25, 2017

(54) FUEL CELL STACK HAVING END PLATE WITH EXTERNAL COOLANT MANIFOLD

(75) Inventor: Masaharu Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1104 days.

(21) Appl. No.: 13/528,151

(22) Filed: Jun. 20, 2012

(65) Prior Publication Data

US 2013/0004876 A1 Jan. 3, 2013

(30) Foreign Application Priority Data

Jun. 28, 2011 (JP) ................................ 2011-143072
Jun. 28, 2011 (JP) ................................ 2011-143080

(51) Int. Cl.
*H01M 8/04* (2016.01)
*H01M 8/04007* (2016.01)

(52) U.S. Cl.
CPC ......... *H01M 8/04007* (2013.01); *Y02E 60/50* (2013.01)

(58) Field of Classification Search
CPC ...... H01M 8/04007; H01M 8/04; Y02E 60/50
USPC .................................. 429/434, 535
See application file for complete search history.

(56) References Cited

U.S. PATENT DOCUMENTS

| 7,964,318 | B2 | 6/2011 | Suzuki et al. | |
|---|---|---|---|---|
| 8,470,490 | B2 | 6/2013 | Takeyama | |
| 2007/0218332 | A1* | 9/2007 | Suzuki | H01M 8/04029 429/434 |
| 2010/0310958 | A1* | 12/2010 | Naito | H01M 8/0258 429/434 |

FOREIGN PATENT DOCUMENTS

| CN | 101836322 A | 9/2010 |
|---|---|---|
| JP | 07-263247 A | 10/1995 |
| JP | 2007-273447 A | 10/2007 |
| JP | 2009-295303 A | 12/2009 |
| JP | 2011-054425 A | 3/2011 |
| JP | 2011-060449 A | 3/2011 |

OTHER PUBLICATIONS

Chinese Office Action dated Sep. 26, 2014 issued over the corresponding CN Patent Application No. 201210211282.0 with the English translation of pertinent portion.
Japanese Office Action dated Jul. 22, 2014 issued over the corresponding JP Patent Application 2011-143072 with English translation of pertinent portion.
Japanese Office Action dated Jul. 22, 2014 issued over the corresponding JP Patent Application 2011-143080 with English translation of pertinent portion.
Office Action dated Mar. 27, 2014 issued over the corresponding CN Patent Application No. 201210211282.0 with the English translation of the pertinent portion.

\* cited by examiner

*Primary Examiner* — Gary Harris
(74) *Attorney, Agent, or Firm* — Carrier Blackman & Associates, P.C.; William D. Blackman; Joseph P. Carrier

(57) ABSTRACT

A first end plate of a fuel cell stack has a coolant supply manifold and a coolant discharge manifold. The coolant supply manifold includes a pair of manifold sections and a supply coupling section coupling upper portions of the pair of supply manifold sections. The pair of supply manifold sections communicate with a pair of coolant supply passages of the first end plate. A coolant supply pipe is coupled to a lower end of one of the supply manifold sections with an inclination of a predetermined angle from a vertical direction toward a horizontal direction.

10 Claims, 17 Drawing Sheets

⇨ OXYGEN-CONTAINING GAS
⇨ COOLANT
⇨ FUEL GAS

⇨ OXYGEN-CONTAINING GAS
⇨ COOLANT
⇨ FUEL GAS

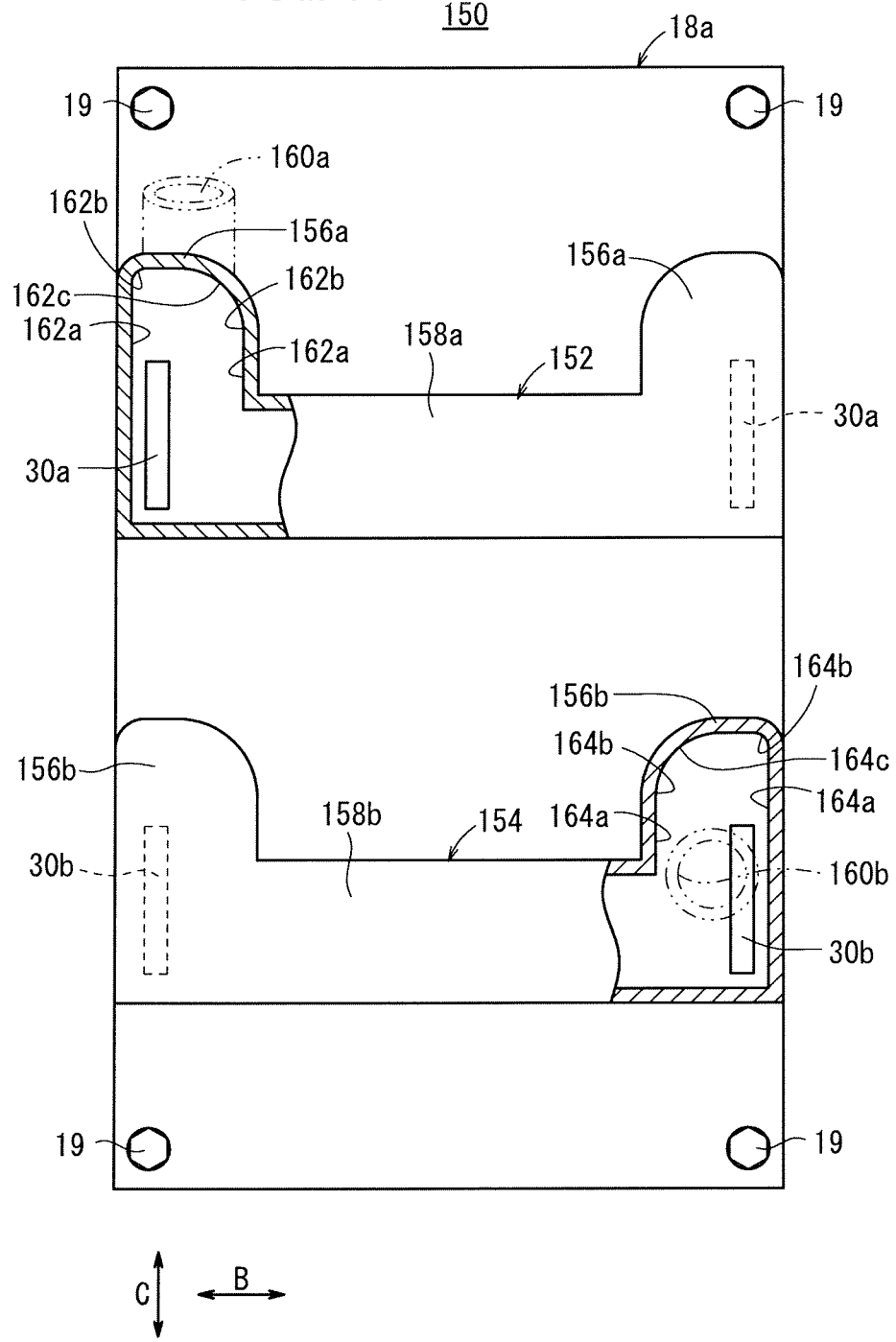

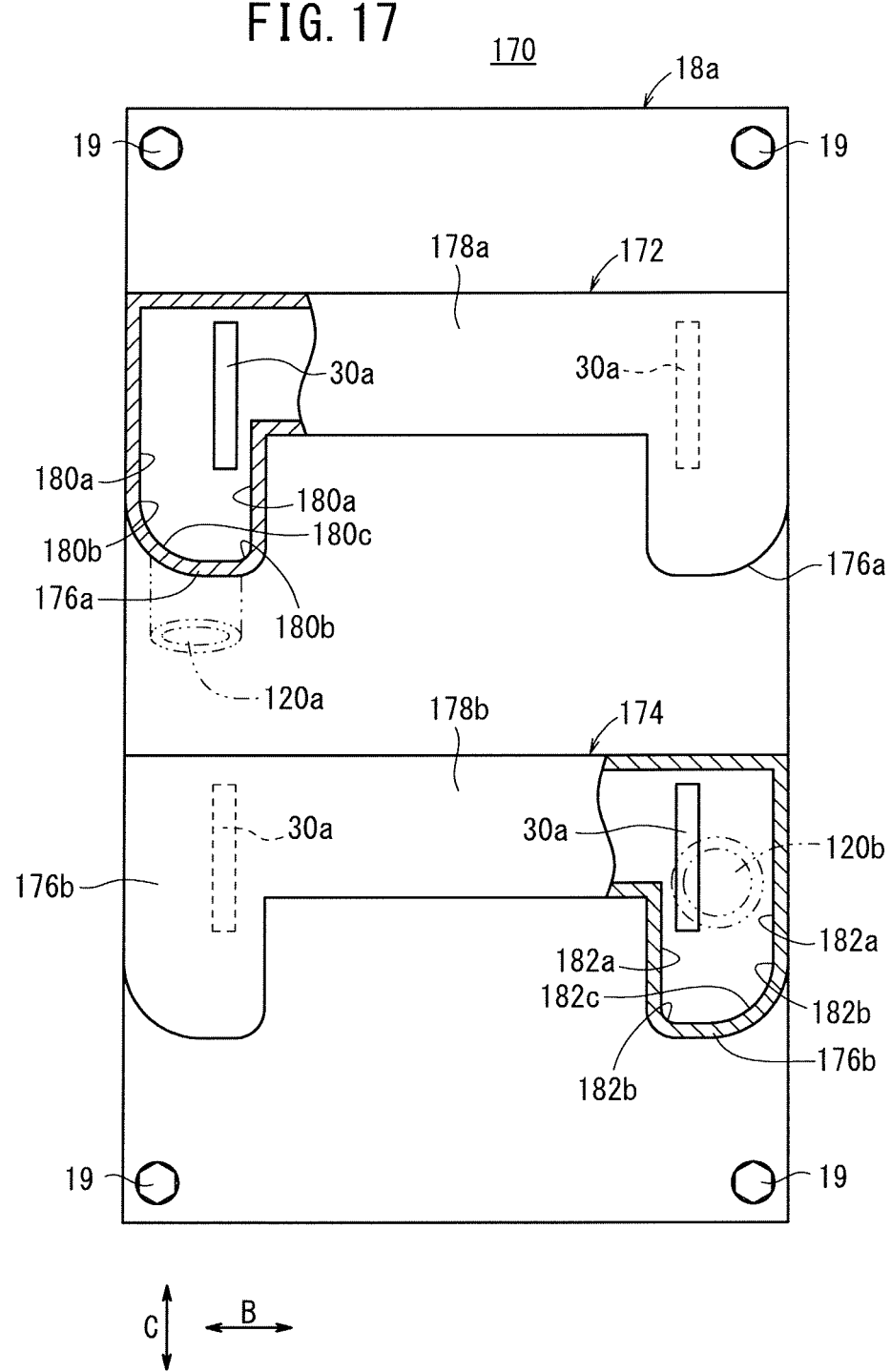

FUEL CELL STACK HAVING END PLATE WITH EXTERNAL COOLANT MANIFOLD

CROSS-REFERENCE TO RELATED APPLICATION

This application is based upon and claims the benefit of priority from Japanese Patent Applications No. 2011-143072 filed on Jun. 28, 2011 and No. 2011-143080 filed on Jun. 28, 2011, of which the contents are incorporated herein by reference.

BACKGROUND OF THE INVENTION

Field of the Invention

The present invention relates to a fuel cell stack formed by stacking an electrolyte electrode assembly and a separator in a stacking direction. The electrolyte electrode assembly includes a pair of electrodes and an electrolyte interposed between the electrodes. Rectangular end plates are provided at both ends in the stacking direction.

Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a polymer ion exchange membrane. The membrane electrode assembly and separators sandwiching the membrane electrode assembly make up a unit cell. In use, generally, a predetermined number of unit cells are stacked together to form a fuel cell stack mounted in a vehicle.

Mostly, the fuel cell stack of this type adopts an internal manifold structure where a fuel gas supply passage and a fuel gas discharge passage as passages of a fuel gas, an oxygen-containing gas supply passage and an oxygen-containing gas discharge passage as passages of an oxygen-containing gas, and a coolant supply passage and a coolant discharge passage as passages of a coolant extend through the unit cells in the stacking direction.

As a technique related to the internal manifold type fuel cell, for example, Japanese Laid-Open Patent Publication No. 2011-054425 (hereinafter referred to as the conventional technique 1) is known. The conventional technique 1 relates to a fuel cell stack formed by stacking electrolyte electrode assemblies and separators in a stacking direction. Each of the electrolyte electrode assemblies includes a pair of electrodes and an electrolyte interposed between the electrodes. Rectangular end plates are provided at both ends in the stacking direction.

A pair of coolant supply passages and a pair of coolant discharge passages extend through two opposite long sides of the fuel cell stack in the stacking direction as passages of a coolant. One of the end plates includes a pair of manifold sections connected to at least one pair of the pair of coolant supply passages and the pair of coolant discharge passages, and a coupling section for coupling the pair of manifold sections together. The width of the coupling section along the long sides is smaller than the width of the pair of manifold sections.

According to the disclosure, increase in the pressure loss of the coolant flowing into the manifold is suppressed effectively, and it becomes possible to supply the coolant to the fuel cells smoothly and uniformly.

SUMMARY OF THE INVENTION

The present invention has been made to provide a technique related to the internal manifold type fuel cell of this type, and an object of the present invention is to provide a fuel cell stack which makes it possible to suitably reduce pressure loss particularly in a manifold, and supply a coolant to fuel cells smoothly and uniformly.

The present invention relates to a fuel cell stack formed by stacking an electrolyte electrode assembly and a separator in a stacking direction. The electrolyte electrode assembly includes a pair of electrodes and an electrolyte interposed between the electrodes. Rectangular end plates are provided at both ends in the stacking direction.

A pair of coolant supply passages and a pair of coolant discharge passages extend through two opposite long sides of the fuel cell stack in the stacking direction as passages of a coolant.

One of the end plates includes a pair of supply manifold sections communicating with the pair of the coolant supply passages and elongated along the two sides, and a supply coupling section for coupling the pair of supply manifold sections together. A coolant supply pipe is coupled to one of the supply manifold sections in a direction inclined from the stacking direction.

Further, one of the end plates includes a pair of supply manifold sections communicating with the pair of the coolant supply passages and elongated along the two sides, a supply coupling section for coupling the pair of supply manifold sections together. An inclined portion inclined smoothly from a straight portion through a curved portion is provided on the inner wall surface of at least one of the supply manifold sections.

In the present invention, the coolant supply pipe is coupled to one of the supply manifold sections, in a direction inclined from the stacking direction. Thus, since the coolant is supplied to one of the supply manifolds from the direction inclined from the stacking direction, the pressure loss of the coolant flowing into the one of the supply manifold sections is reduced as much as possible. With simple structure, it becomes possible to supply the coolant to fuel cells smoothly and uniformly.

Further, in the present invention, the inclined portion inclined smoothly from the straight portion through the curved portion is provided on the inner wall surface of one of the supply manifold sections. In the structure, the pressure loss of the coolant flowing into the one of the supply manifold sections is reduced as much as possible, and the distribution performance of the coolant into the pair of coolant supply passages is improved. With simple structure, it becomes possible to supply the coolant to the fuel cells smoothly and uniformly.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 16 is a front view showing the fuel cell stack; and

FIG. 17 is front view showing a fuel cell stack according to a seventh embodiment of the present invention.

DESCRIPTION OF THE PREFERRED EMBODIMENTS

Figure 1:
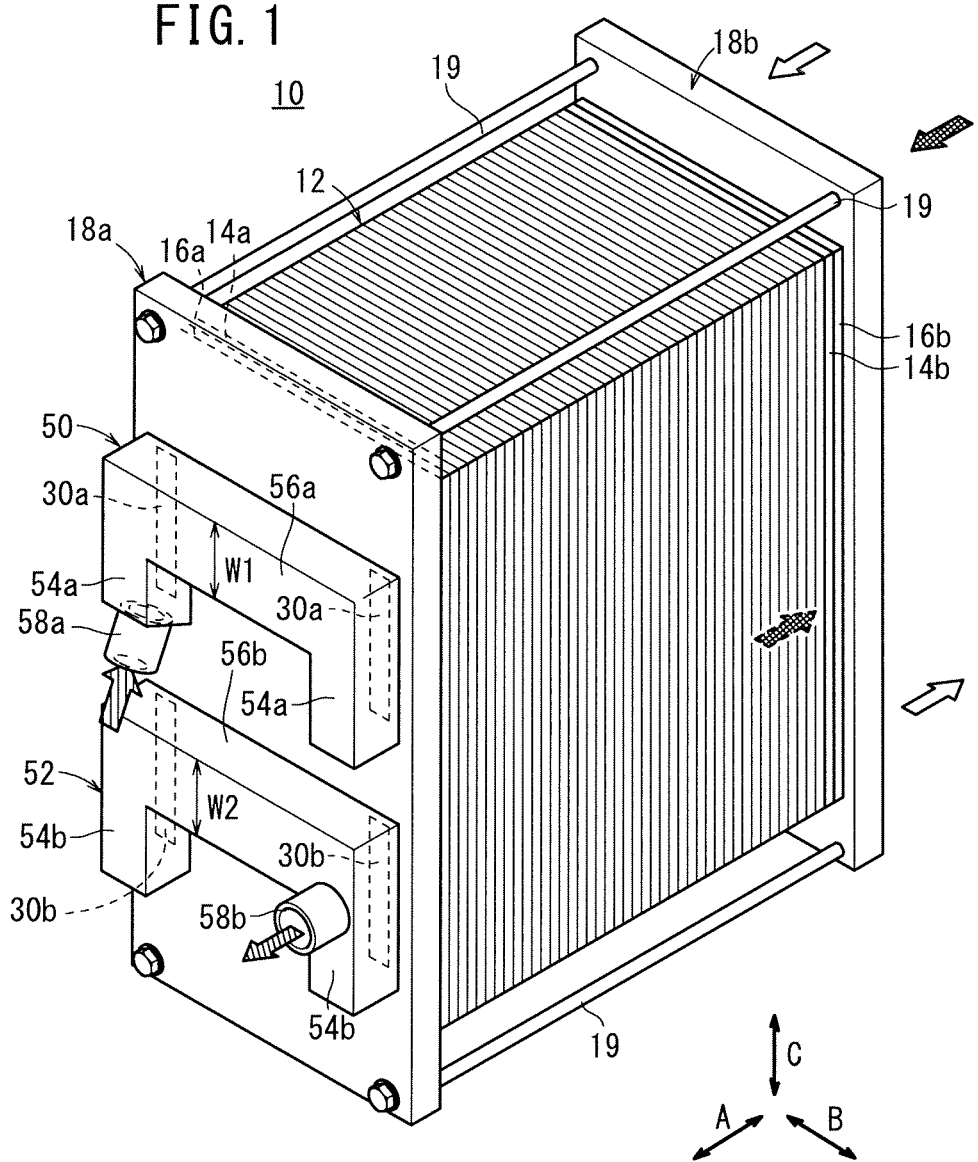
FIG. 1 is a perspective view schematically showing a fuel cell stack according to a first embodiment of the present invention.

As shown in FIG. 1, a fuel cell stack 10 according to a first embodiment of the present invention includes fuel cells 12, and the fuel cells 12 are stacked in a horizontal direction indicated by an arrow A or in a vertical direction indicated by an arrow C.

A first terminal plate 14a, a first insulating plate 16a, and a first end plate 18a are stacked at one end of the fuel cells 12 in the stacking direction. Further, a second terminal plate 14b, a second insulating plate 16b, and a second end plate 18b are stacked at the other end of the fuel cells 12 in the stacking direction.

Components between the first end plate 18a and the second end plate 18b each having a rectangular shape are tightened together by a plurality of tie-rods 19 extending in the direction indicated by the arrow A. Alternatively, components of the fuel cell stack 10 are held together by a box-shaped casing (not shown) including the first end plate 18a and the second end plate 18b.

Figure 2:
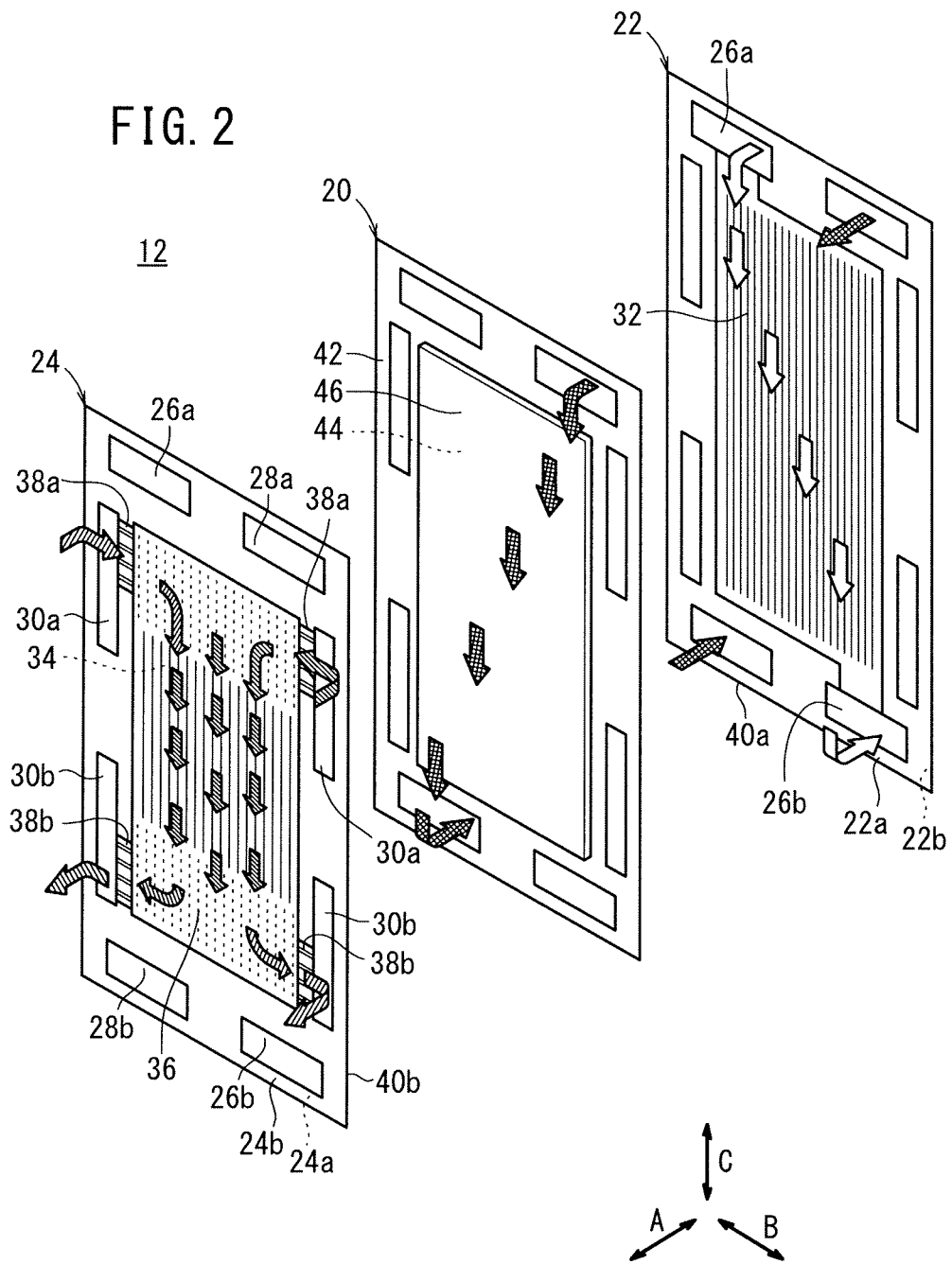
FIG. 2 is an exploded perspective view showing a fuel cell of the fuel cell stack.

As shown in FIG. 2, the fuel cell 12 is formed by sandwiching a membrane electrode assembly (electrolyte electrode assembly) 20 between first and second separators 22, 24. Carbon separators may be used as the first and second separators 22, 24. Alternatively, the first and second separators 22, 24 may be metal separators of, e.g., steel plates, stainless steel plates, aluminum plates, or plated steel sheets.

At an upper end of the fuel cell 12 in the direction of gravity indicated by the arrow C in FIG. 2, an oxygen-containing gas supply passage 26a for supplying an oxygen-containing gas and a fuel gas supply passage 28a for supplying a fuel gas, e.g., a hydrogen-containing gas, are arranged in a horizontal direction indicated by an arrow B. The oxygen-containing gas supply passage 26a and the fuel gas supply passage 28a extend through the fuel cells 12 in the direction indicated by the arrow A.

At a lower end of the fuel cell 12 in the direction indicated by the arrow C, an oxygen-containing gas discharge passage 26b for discharging the oxygen-containing gas, and a fuel gas discharge passage 28b for discharging the fuel gas are arranged in the direction indicated by the arrow B. The oxygen-containing gas discharge passage 26b and the fuel gas discharge passage 28b extend through the fuel cell 12 in the direction indicated by the arrow A.

At both ends (two long sides) of the fuel cell 12 in the direction indicated by the arrow B, a pair of coolant supply passages 30a for supplying a coolant and a pair of coolant discharge passages 30b for discharging the coolant are arranged, e.g., at upper and lower positions. Two or more coolant supply passages 30a or two or more coolant discharge passages 30b may be arranged vertically at upper and lower positions.

The first separator 22 has an oxygen-containing gas flow field 32 on its surface 22a facing the membrane electrode assembly 20. The oxygen-containing gas flow field 32 is connected to the oxygen-containing gas supply passage 26a and the oxygen-containing gas discharge passage 26b.

The second separator 24 has a fuel gas flow field 34 on its surface 24a facing the membrane electrode assembly 20. The fuel gas flow field 34 is connected to the fuel gas supply passage 28a and the fuel gas discharge passage 28b.

A coolant flow field 36 is formed between a surface 22b of the first separator 22 of one of the adjacent fuel cells 12 and a surface 24b of the second separator 24 of the other of the adjacent fuel cells 12. The coolant flow field 36 connects the pair of coolant supply passages 30a with the pair of coolant discharge passages 30b. The pair of coolant supply passages 30a have the same cross sectional area, and the pair of coolant discharge passages 30b have the same cross sectional area. The coolant supply passages 30a are connected to the coolant flow field 36 through connection channels 38a, and the coolant discharge passages 30b are connected to the coolant flow field 36 through connection channels 38b.

A first seal member 40a is formed integrally with the surfaces 22a, 22b of the first separator 22. Alternatively, a first seal member 40a separate from the first separator 22 may be provided on the surfaces 22a, 22b of the first separator 22. A second seal member 40b is formed integrally with the surfaces 24a, 24b of the second separator 24. Alternatively, a second seal member 40b separate from the second separator 24 may be provided on the surfaces 24a, 24b of the second separator 24.

The membrane electrode assembly 20 includes a cathode 44 and an anode 46, and a solid polymer electrolyte membrane (electrolyte) 42 interposed between the cathode 44 and the anode 46. The solid polymer electrolyte membrane 42 is formed by impregnating a thin membrane of perfluorosulfonic acid with water, for example.

Each of the cathode 44 and the anode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 44 and the electrode catalyst layer of the anode 46 are fixed to both surfaces of the solid polymer electrolyte membrane 42, respectively.

As shown in FIG. 1, a coolant supply manifold 50 is provided at an upper position on the outer surface of the first end plate 18a, and a coolant discharge manifold 52 is provided at a lower position on the outer surface of the first end plate 18a. Each of the coolant supply manifold 50 and the coolant discharge manifold 52 has a substantially U-shape which is opened downward.

Alternatively, for example, the coolant supply manifold 50 may be provided on the first end plate 18a, and for example, the coolant discharge manifold 52 may be provided on the second end plate 18b. Conversely, the coolant supply manifold 50 may be provided on the second end plate 18b, and the coolant discharge manifold 52 may be provided on the first end plate 18a.

Figure 3:
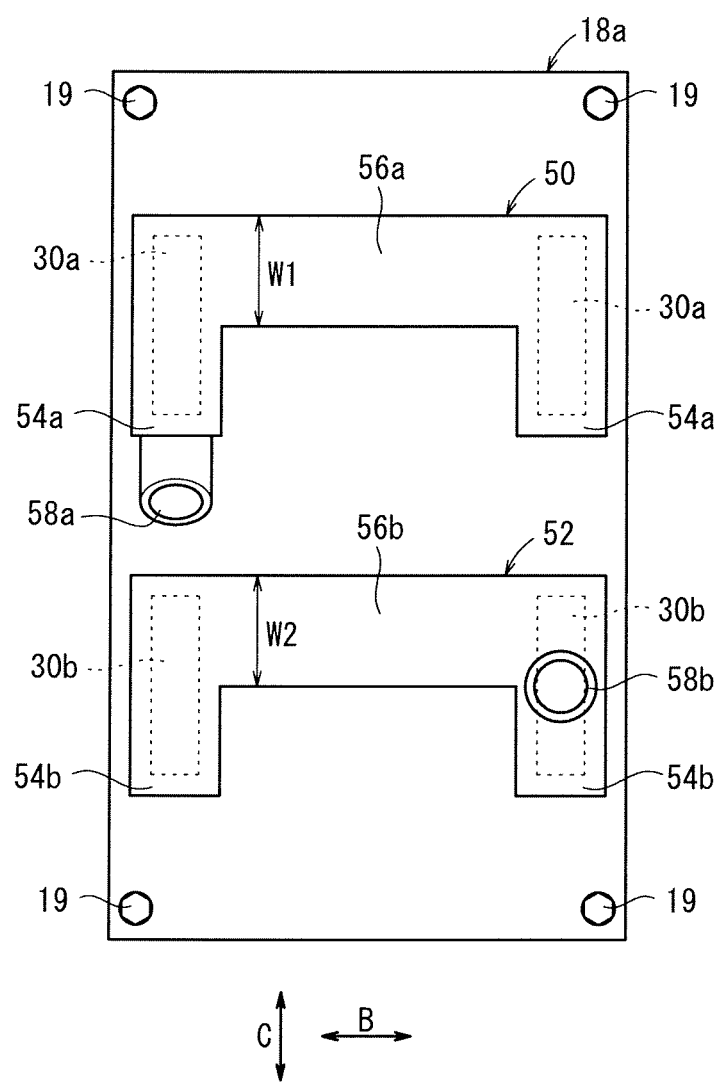
FIG. 3 is a front view showing a first end plate of the fuel cell stack.

As shown in FIGS. 1 and 3, the coolant supply manifold 50 includes a pair of supply manifold sections 54a and a supply coupling section 56a coupling upper portions of the pair of supply manifold sections 54a together. The pair of supply manifold sections 54a communicate with the pair of coolant supply passages 30a of the first end plate 18a. The width W1 of the supply coupling section 56a in the longitudinal direction of the first end plate 18a indicated by the arrow C is smaller than the size of the pair of supply manifold sections 54a in the longitudinal direction.

The supply manifold sections 54a have a rectangular parallelepiped shape elongated in the longitudinal direction along the long sides of the first end plate 18a indicated by the arrow C. A coolant supply pipe 58a extending to the outside of the first end plate 18a is provided separately (or integrally) on one of the supply manifold sections 54a. The coolant supply pipe 58a is connected to a coolant supply section (not shown).

Figure 4:
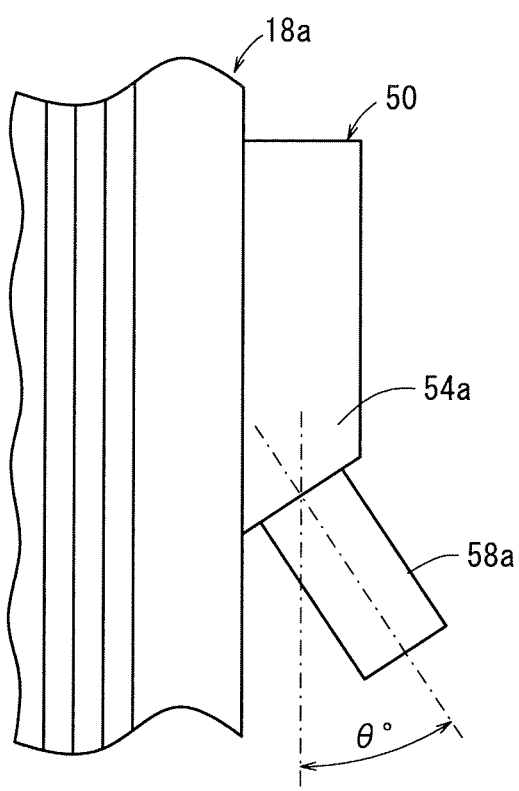
FIG. 4 is a side view showing the first end plate.

As shown in FIG. 4, the coolant supply pipe 58a is connected to a lower end of one of the supply manifold sections 54a with an inclination of a predetermined angle θ° (e.g., 10° to 40°) from a vertical direction toward a horizontal direction. The coolant supply pipe 58a supplies the coolant into the one of the supply manifold sections 54a obliquely from below.

As shown in FIGS. 1 and 3, the coolant discharge manifold 52 includes a pair of discharge manifold sections 54b and a discharge coupling section 56b coupling upper portions of the pair of discharge manifold sections 54b together. The pair of discharge manifold sections 54b communicate with the pair of coolant discharge passages 30b of the first end plate 18a. The width W2 of the discharge coupling section 56b in the longitudinal direction of the first end plate 18a indicated by the arrow C is smaller than the size of the pair of discharge manifold sections 54b in the longitudinal direction.

The discharge manifold sections 54b have a rectangular parallelepiped shape elongated in the longitudinal direction along the long sides of the first end plate 18a indicated by the arrow C. A coolant discharge pipe 58b extending to the outside of the first end plate 18a is provided separately (or integrally) on one of the discharge manifold sections 54b that is located at a diagonal position of the one of the supply manifold sections 54a. This coolant discharge pipe 58b extends in a horizontal direction indicated by the arrow A from a central (or upper or lower) portion of one of the discharge manifold sections 54b.

Though not shown, manifolds are provided on the second end plate 18b, corresponding to the oxygen-containing gas supply passage 26a, the oxygen-containing gas discharge passage 26b, the fuel gas supply passage 28a, and the fuel gas discharge passage 28b, respectively.

Next, operation of the fuel cell stack 10 will be described below.

Firstly, at the second end plate 18b, an oxygen-containing gas is supplied to the oxygen-containing gas supply passage 26a, and a fuel gas such as a hydrogen-containing gas is supplied to the fuel gas supply passage 28a.

Further, as shown in FIG. 1, at the first end plate 18a, a coolant such as pure water, ethylene glycol or oil is supplied from the coolant supply pipe 58a to the coolant supply manifold 50. Some of the coolant is supplied from one of the supply manifold sections 54a having the coolant supply pipe 58a to the coolant supply passage 30a on one side, and the remaining coolant is supplied through the supply coupling section 56a and from the other supply manifold section 54a to the coolant supply passage 30a on the other side.

In the structure, as shown in FIG. 2, the oxygen-containing gas flows from the oxygen-containing gas supply passage 26a into the oxygen-containing gas flow field 32 of the first separator 22. The oxygen-containing gas flows along the oxygen-containing gas flow field 32 in the direction of gravity indicated by the arrow C, and the oxygen-containing gas is supplied to the cathode 44 of the membrane electrode assembly 20.

The fuel gas flows from the fuel gas supply passage 28a into the fuel gas flow field 34 of the second separator 24. The fuel gas flows along the fuel gas flow field 34 in the direction of gravity indicated by the arrow C, and the fuel gas is supplied to the anode 46 of the membrane electrode assembly 20.

Thus, in the membrane electrode assembly 20, the oxygen-containing gas supplied to the cathode 44 and the fuel gas supplied to the anode 46 are consumed in the electrochemical reactions at the electrode catalyst layers of the cathode 44 and the anode 46 for generating electricity.

Then, the oxygen-containing gas consumed at the cathode 44 of the membrane electrode assembly 20 is discharged along the oxygen-containing gas discharge passage 26b in the direction indicated by the arrow A. The fuel gas consumed at the anode 46 of the membrane electrode assembly 20 is discharged along the fuel gas discharge passage 28b in the direction indicated by the arrow A.

The coolant supplied to the two coolant supply passages 30a flows into the coolant flow field 36 formed between the first separator 22 and the second separator 24. The coolant moves in the direction indicated by the arrow C to cool the membrane electrode assembly 20, and then, the coolant is discharged from the two coolant discharge passages 30b to the pair of discharge manifold sections 54b of the coolant discharge manifold 52.

As shown in FIG. 1, the coolant discharged to one of the discharge manifold sections 54b is discharged to the outside directly through the coolant discharge pipe 58b. The coolant discharged to the other of the discharge manifold sections 54b flows through the discharge coupling section 56b, and flows into the one of the discharge manifold sections 54b. Then, the coolant is discharged to the outside through the coolant discharge pipe 58b.

In the first embodiment, as shown in FIG. 4, the coolant supply pipe 58a is connected to a lower end of one of the supply manifold sections 54a with an inclination of a predetermined angle θ° (e.g., 10° to 40°) from a vertical direction toward a horizontal direction. Therefore, the coolant supply pipe 58a supplies the coolant into the one of the supply manifold sections 54a obliquely from below.

Thus, pressure loss of the coolant flowing into the one of the supply manifold sections 54a is reduced as much as possible. With such a simple structure, it becomes possible to supply the coolant to the fuel cell stack 10 smoothly and uniformly.

Figure 5:
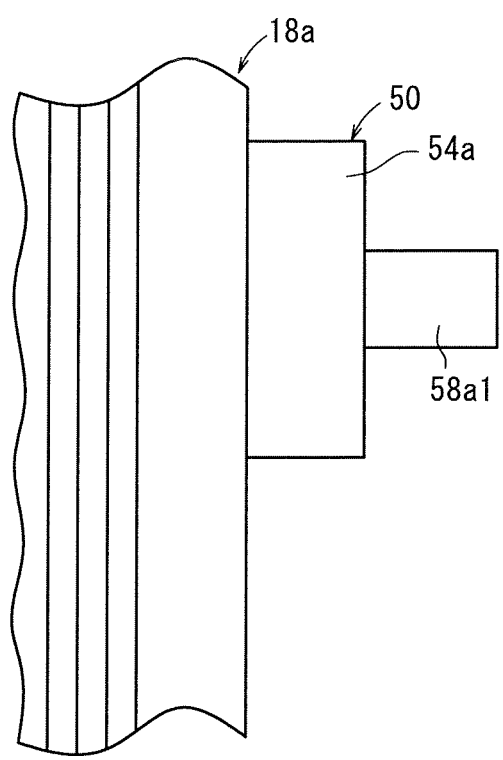
FIG. 5 is a side view showing a comparative example 1.

Specifically, in a comparative example 1 shown in FIG. 5, a coolant supply pipe 58a1 is coupled to one of the supply manifold sections 54a at a substantially central portion in the height direction. The coolant supply pipe 58a1 extends in the stacking direction (horizontal direction).

Figure 6:
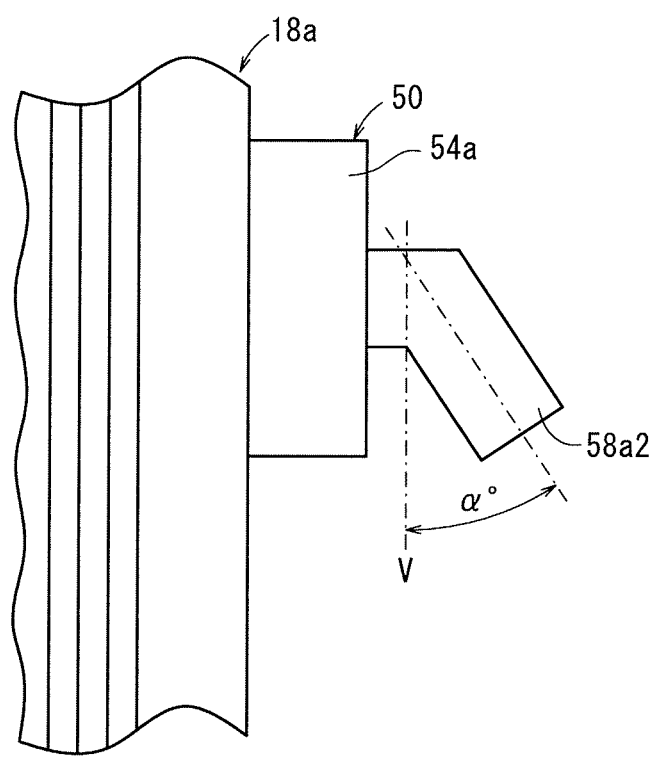
FIG. 6 is a side view showing a comparative example 2.

Further, in a comparative example 2 shown in FIG. 6, a coolant supply pipe 58*a*2 is coupled to one of the supply manifold sections 54*a*, at a substantially central portion in the height direction. The coolant supply pipe 58*a*2 is inclined at an angle α° from the vertical direction V to the horizontal direction. An end of the coolant supply pipe 58*a*2 is curved in the stacking direction (horizontal direction), and connected to one of the supply manifold sections 54*a*.

Figure 7:
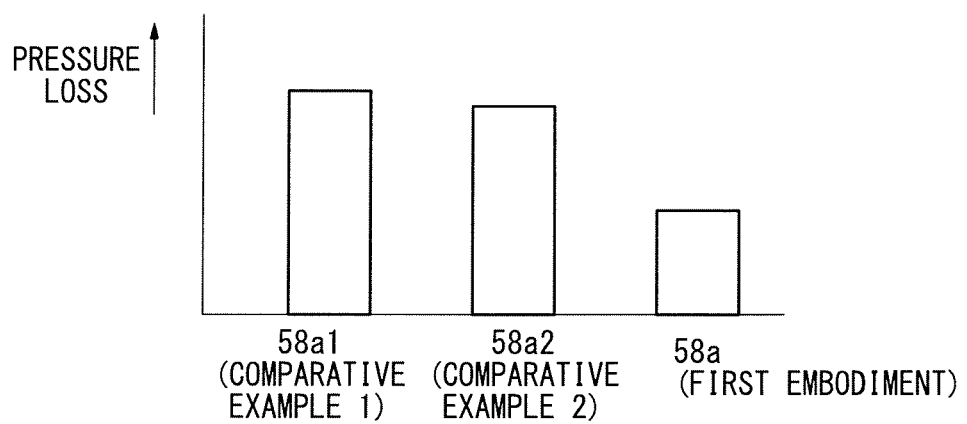
FIG. 7 is a graph showing comparison of pressure losses in manifolds according to the comparative example 1, the comparative example 2, and the first embodiment.

FIG. 7 shows pressure losses in one of the supply manifold sections 54*a*. In comparison with the comparative example 1 and the comparative example 2, in the first embodiment, the pressure loss is reduced significantly. Further, in the first embodiment, the coolant can be distributed to the pair of coolant supply passages 30*a* smoothly in comparison with the comparative example 1 and the comparative example 2.

Figure 8:
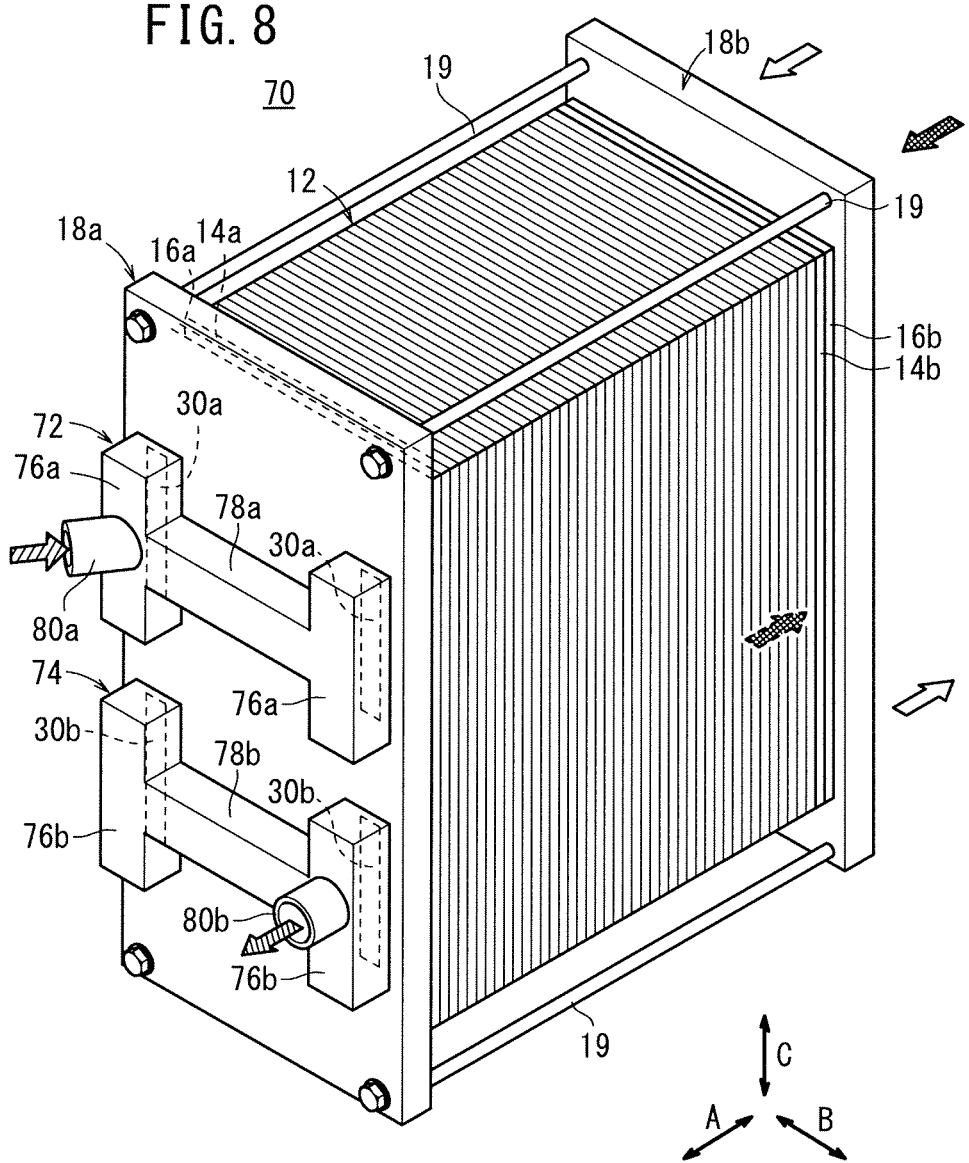
FIG. 8 is a perspective view schematically showing a fuel cell stack according to a second embodiment of the present invention.

FIG. 8 is a perspective view schematically showing a fuel cell stack 70 according to a second embodiment of the present invention.

The constituent elements that are identical to those of the fuel cell stack 10 according to the first embodiment are labeled with the same reference numerals, and descriptions thereof are omitted. Also, in third and other embodiments described later, the constituent elements that are identical to those of the fuel cell stack 10 according to the first embodiment are labeled with the same reference numerals, and descriptions thereof are omitted.

The fuel cell stack 70 includes a coolant supply manifold 72 and a coolant discharge manifold 74 provided on the outer surface of the first end plate 18*a*. Each of the coolant supply manifold 72 and the coolant discharge manifold 74 has a substantially H-shape.

The coolant supply manifold 72 includes a pair of longitudinally elongated supply manifold sections 76*a* and a supply coupling section 78*a* coupling substantially central portions of the pair of supply manifold sections 76*a* together. The pair of supply manifold sections 76*a* communicate with the pair of coolant supply passages 30*a*. The width of the supply coupling section 78*a* in the longitudinal direction of the first end plate 18*a* indicated by the arrow C is smaller than the size of the pair of supply manifold sections 76*a* in the longitudinal direction. A coolant supply pipe 80*a* extending to the outside of the first end plate 18*a* is provided at one of the supply manifold sections 76*a*.

The coolant supply pipe 80*a* is coupled to a central portion of one of the supply manifold sections 76*a* with an inclination from the stacking direction toward an outwardly horizontal direction. The outwardly horizontal direction herein means a direction that is inclined relative to the supply manifold section 76*a* from the stacking direction (indicated by the arrow A) toward a direction opposite to the supply coupling section 78*a*. The coolant supply pipe 80*a* supplies the coolant into the one of the supply manifold sections 76*a* obliquely from the side.

The coolant discharge manifold 74 includes a pair of discharge manifold sections 76*b* and a discharge coupling section 78*b* coupling substantially central portions of the pair of discharge manifold sections 76*b* together. The pair of discharge manifold sections 76*b* communicate with the pair of coolant discharge passages 30*b*. The width of the discharge coupling section 78*b* in the longitudinal direction of the first end plate 18*a* indicated by the arrow C is smaller than the size of the pair of discharge manifold sections 76*b* in the longitudinal direction.

A coolant discharge pipe 80*b* extending to the outside of the first end plate 18*a* is provided on the discharge manifold section 76*b* at a diagonal position of the coolant supply pipe 80*a*. The coolant discharge pipe 80*b* extends in the horizontal direction (stacking direction) from the central portion of the one of the discharge manifold sections 76*b*.

In the second embodiment, the coolant supply pipe 80*a* is coupled to the central portion of one of the supply manifold sections 76*a* with an inclination from the stacking direction toward the outwardly horizontal direction. Therefore, the coolant flowing through the coolant supply pipe 80*a* is supplied into the one of the supply manifold sections 76*a* obliquely from the side.

Thus, pressure loss of the coolant flowing into the one of the supply manifold sections 76*a* is reduced as much as possible. With such a simple structure, the same advantages as in the case of the first embodiment are obtained. For example, it becomes possible to supply the coolant to the fuel cell stack 70 smoothly and uniformly.

Figure 9:
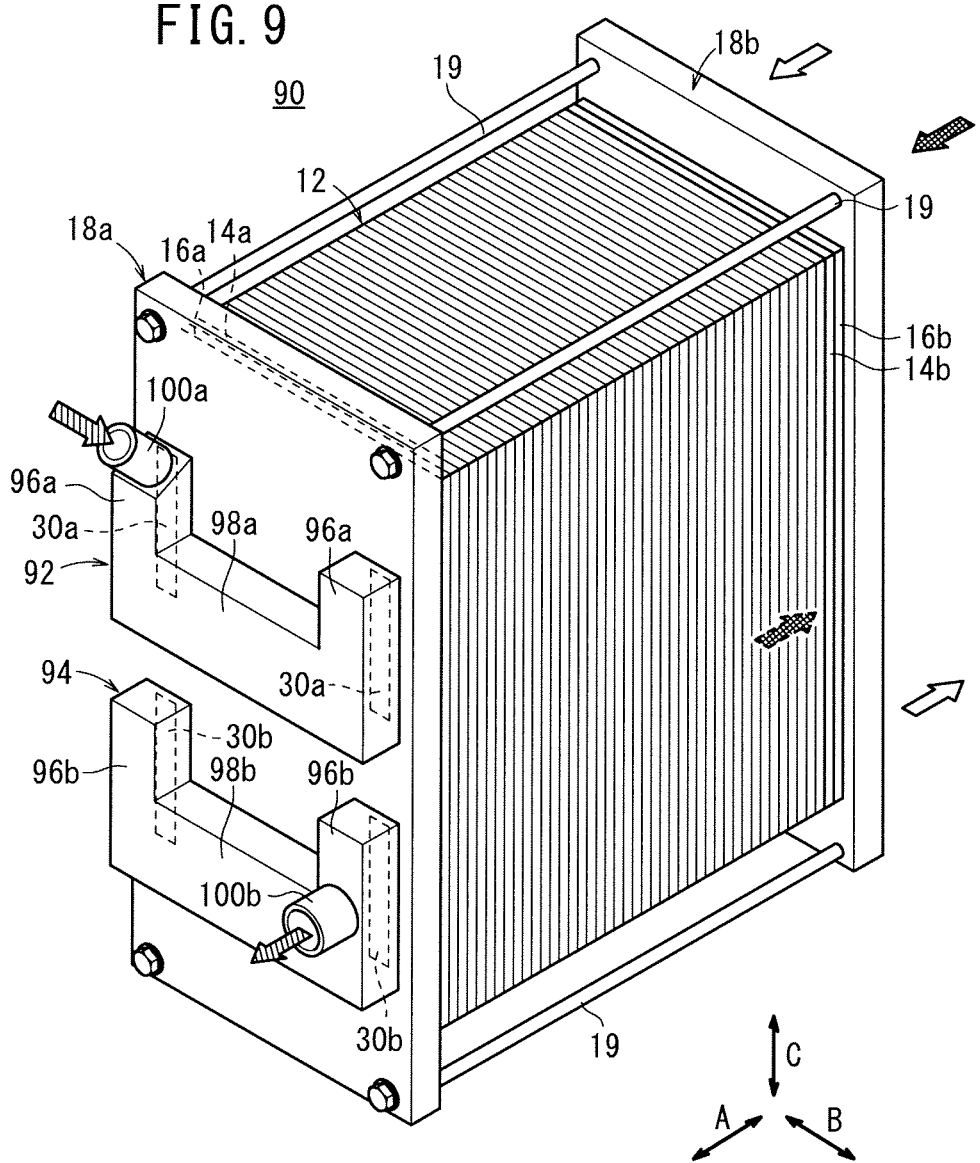
FIG. 9 is a perspective view schematically showing a fuel cell stack according to a third embodiment of the present invention.

FIG. 9 is a perspective view schematically showing a fuel cell stack 90 according to a third embodiment of the present invention.

The fuel cell stack 90 includes a coolant supply manifold 92 and a coolant discharge manifold 94 provided on the outer surface of the first end plate 18*a*. Each of the coolant supply manifold 92 and the coolant discharge manifold 94 has a substantially U-shape which is opened upward.

The coolant supply manifold 92 includes a pair of longitudinally elongated supply manifold sections 96*a* and a supply coupling section 98*a* coupling lower portions of the pair of supply manifold sections 96*a* together. The pair of supply manifold sections 96*a* communicate with the pair of coolant supply passages 30*a*. The width of the supply coupling section 98*a* in the longitudinal direction of the first end plate 18*a* indicated by the arrow C is smaller than the size of the pair of supply manifold sections 96*a* in the longitudinal direction. A coolant supply pipe 100*a* extending to the outside of the first end plate 18*a* is provided separately (or integrally) on one of the supply manifold sections 96*a*.

The coolant supply pipe 100*a* is connected to an upper end of one of the supply manifold sections 96*a* with an inclination from the vertical direction toward the horizontal direction. The coolant supply pipe 100*a* supplies the coolant into the one of the supply manifold sections 96*a* obliquely from above.

The coolant discharge manifold 94 includes a pair of discharge manifold sections 96*b* and a discharge coupling section 98*b* coupling lower portions of the pair of discharge manifold sections 96*b* together. The pair of discharge manifold sections 96*b* communicate with the pair of coolant discharge passages 30*b*. The width of the discharge coupling section 98*b* in the longitudinal direction of the first end plate 18*a* is smaller than the size of the pair of discharge manifold sections 96*b* in the longitudinal direction.

A coolant discharge pipe 100*b* extending to the outside of the first end plate 18*a* is connected to the discharge manifold section 96*b* at a diagonal position of the coolant supply pipe 100*a*. The coolant discharge pipe 100*b* extends in the horizontal direction (stacking direction) from a central (or upper or lower) portion of the one of the discharge manifold sections 96*b*.

In the third embodiment, the coolant supply pipe 100*a* is connected to the upper end of one of the supply manifold sections 96*a* with an inclination from the vertical direction toward the horizontal direction. Therefore, the coolant supply pipe 100*a* supplies the coolant into the one of the supply manifold sections 96*a* obliquely from above.

Thus, pressure loss of the coolant flowing into the one of the supply manifold sections 96*a* is reduced as much as possible. With such a simple structure, the same advantages as in the cases of the first and second embodiments are obtained. For example, it becomes possible to supply the coolant to the fuel cell stack 90 smoothly and uniformly.

In the first to third embodiments, the coolant discharge pipes 58b, 80b, and 100b extend in the horizontal direction. However, the present invention is not limited in this respect. For example, the coolant discharge pipes 58b, 80b, and 100b may have the same structure as the coolant supply pipes 58a, 80a, and 100a. Also in fourth and other embodiments to be described later, coolant discharge pipes may have the same structure as the coolant supply pipes.

Figure 10:
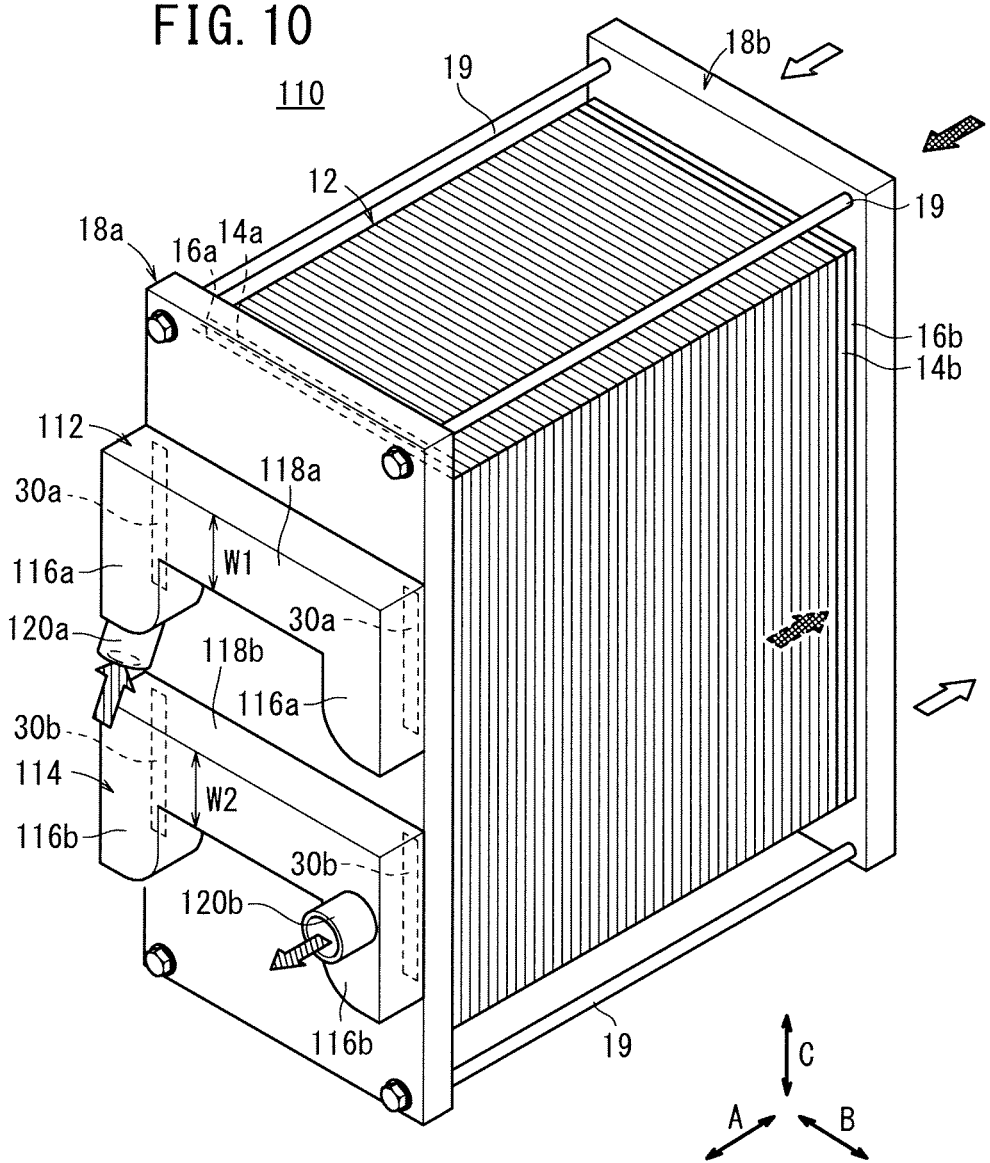
FIG. 10 is a perspective view schematically showing a fuel cell stack according to a fourth embodiment of the present invention.

FIG. 10 is a perspective view showing a fuel cell stack 110 according to a fourth embodiment of the present invention.

The fuel cell stack 110 includes a coolant supply manifold 112 and a coolant discharge manifold 114 provided at upper and lower positions on the outer surface of the first end plate 18a. Each of the coolant supply manifold 112 and the coolant discharge manifold 114 has a substantially U-shape which is opened downward.

Figure 11:
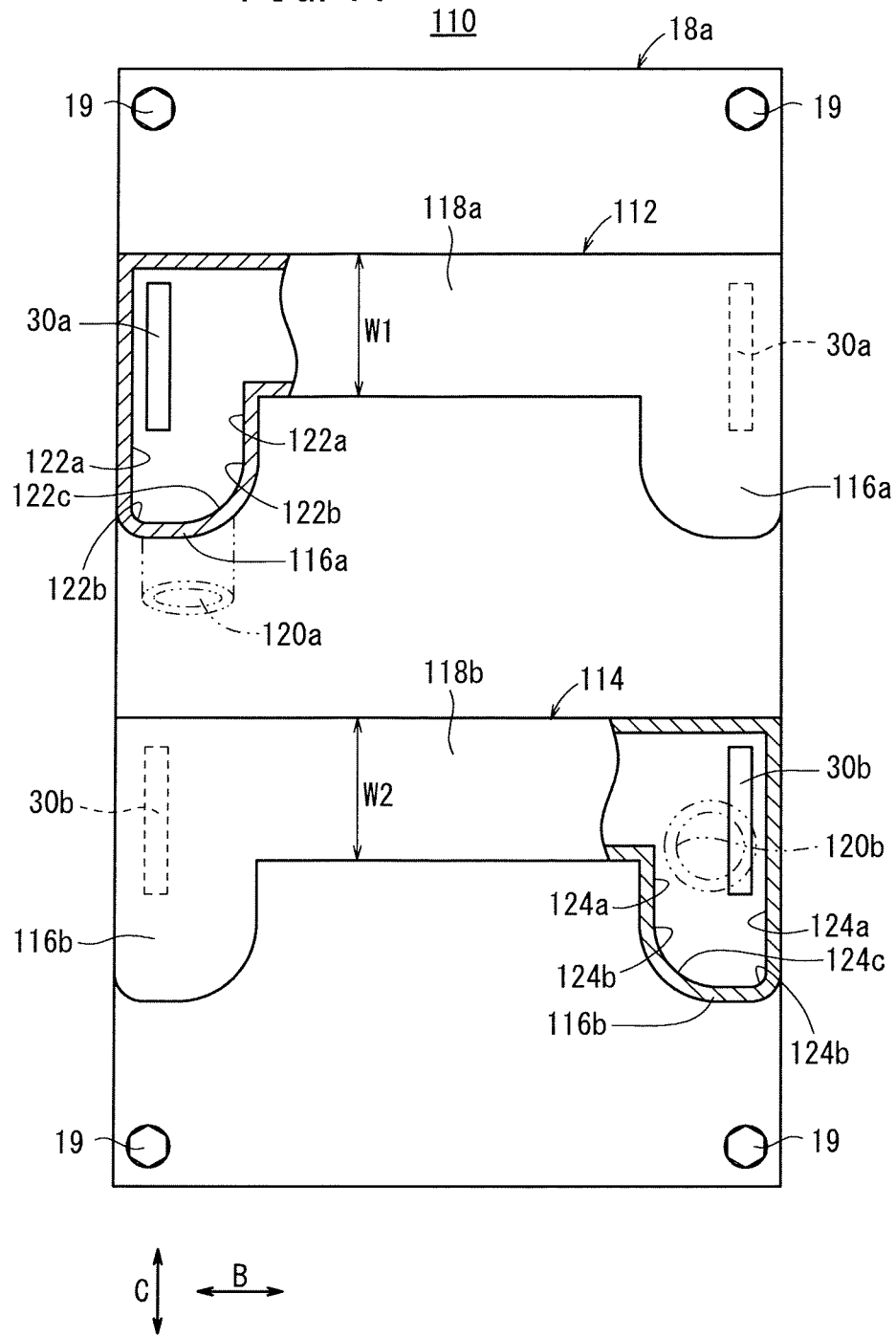
FIG. 11 is a front view showing the fuel cell stack.

As shown in FIGS. 10 and 11, the coolant supply manifold 112 includes a pair of supply manifold sections 116a and a supply coupling section 118a coupling upper portions of the pair of supply manifold sections 116a together. The pair of supply manifold sections 116a communicate with the pair of coolant supply passages 30a of the first end plate 18a. The width W1 of the supply coupling section 118a in the longitudinal direction of the first end plate 18a indicated by the arrow C is smaller than the size of the pair of supply manifold sections 116a in the longitudinal direction.

The supply manifold sections 116a have a rectangular parallelepiped shape elongated in the longitudinal direction along the long sides of the first end plate 18a indicated by the arrow C. A coolant supply pipe 120a extending to the outside of the first end plate 18a is provided separately (or integrally) on one of the supply manifold sections 116a. The coolant supply pipe 120a is connected to a coolant supply section (not shown).

The coolant supply pipe 120a is coupled to the lower end of one of the supply manifold sections 116a with an inclination of a predetermined angle from the vertical direction toward the horizontal direction. The coolant flowing through the coolant supply pipe 120a is supplied into the one of the supply manifold sections 116a obliquely from below.

As shown in FIG. 11, the inner wall surface of the supply manifold section 116a includes an inclined portion 122c inclined smoothly from a straight portion 122a to a curved portion 122b. The inclined portion 122c may be a curved surface or a flat surface. Inclined portions to be described later have the same structure as the above.

The coolant supply passages 30a are off-centered toward the outside in the supply manifold section 116a. The inclined portion 122c is provided at a lower inner corner of the inner wall surface of the supply manifold section 116a (i.e., a corner facing the other supply manifold sections 116a). Preferably, the inclined portion 122c is provided on the inner wall surface of at least one of the supply manifold sections 116a to which the coolant supply pipe 120a is coupled.

As shown in FIGS. 10 and 11, the coolant discharge manifold 114 includes a pair of discharge manifold sections 116b and a discharge coupling section 118b coupling upper portions of the pair of discharge manifold sections 116b together. The pair of discharge manifold sections 116b communicate with the pair of coolant discharge passages 30b of the first end plate 18a. The width W2 of the discharge coupling section 118b in the longitudinal direction of the first end plate 18a indicated by the arrow C is smaller than the size of the pair of discharge manifold sections 116b in the longitudinal direction.

The discharge manifold sections 116b have a rectangular parallelepiped shape elongated in the longitudinal direction along the long sides of the first end plate 18a indicated by the arrow C. A coolant discharge pipe 120b extending to the outside of the first end plate 18a is provided separately (or integrally) on one of the discharge manifold sections 116b that is located at a diagonal position of the one supply manifold section 116a. The coolant discharge pipe 120b extends from a central (or upper or lower) portion of the one discharge manifold section 116b in the horizontal direction (indicated by the arrow A).

As shown in FIG. 11, an inclined portion 124c is provided on the inner wall surface of the discharge manifold section 116b. The inclined portion 124c is inclined smoothly from a straight portion 124a to a curved portion 124b. The coolant discharge passage 30b is off-centered toward the outside in the discharge manifold section 116b. The inclined portion 124c is provided at a lower inner corner of the inner wall surface of the discharge manifold section 116b (i.e., a corner facing the other discharge manifold section 116b). Preferably, the inclined portion 124c is provided on the inner wall surface of at least one of the discharge manifold sections 116b to which the coolant discharge pipe 120b is coupled.

In the fourth embodiment, as shown in FIG. 11, the inclined portion 122c inclined smoothly from the straight portion 122a through the curved portion 122b is provided on the inner wall surface of at least one of the supply manifold sections 116a. The coolant supply passage 30a is off-centered toward the outside in the supply manifold section 116a. The inclined portion 122c is provided at the lower inner corner of the inner wall surface of the supply manifold section 116a.

Thus, pressure loss of the coolant flowing inside the supply manifold section 116a is reduced as much as possible, and the coolant can be distributed to the pair of coolant supply passages 30a suitably. With simple structure, it becomes possible to supply the coolant to the fuel cells smoothly and uniformly.

In the fourth embodiment, in addition to the other supply manifold sections 116a, the pair of discharge manifold sections 116b have the same structure as the one of the supply manifold sections 116a. In the structure, reduction in the pressure loss in the manifolds can be achieved, and the coolant can be distributed smoothly and suitably. Further, in embodiments to be described later, though only the structure of the supply manifold sections will be described, the same advantages can be obtained in other manifold sections.

Figure 12:
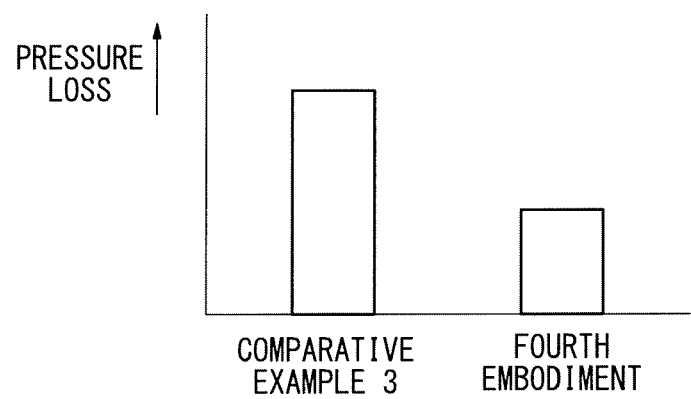
FIG. 12 is a graph showing comparison of pressure losses in manifold sections according to a comparative example 3 and a fourth embodiment.

Then, in a comparative example 3 where inner wall surfaces of the pair of the supply manifold sections 116a and the pair of discharge manifold sections 116b were formed in a rectangular shape, and the fourth embodiment where the inclined portions 122c, 124c were formed on the inner wall surfaces of the pair of the supply manifold sections 116a and the pair of discharge manifold sections 116b, the pressure losses were detected. The results are shown in FIG. 12.

As can be seen from the results, in comparison with the comparative example 3, the pressure loss in the manifold of the fourth embodiment was reduced significantly. Further, in comparison with the comparative example 3, the distribution performance of the coolant in the fourth embodiment was improved.

Figure 13:
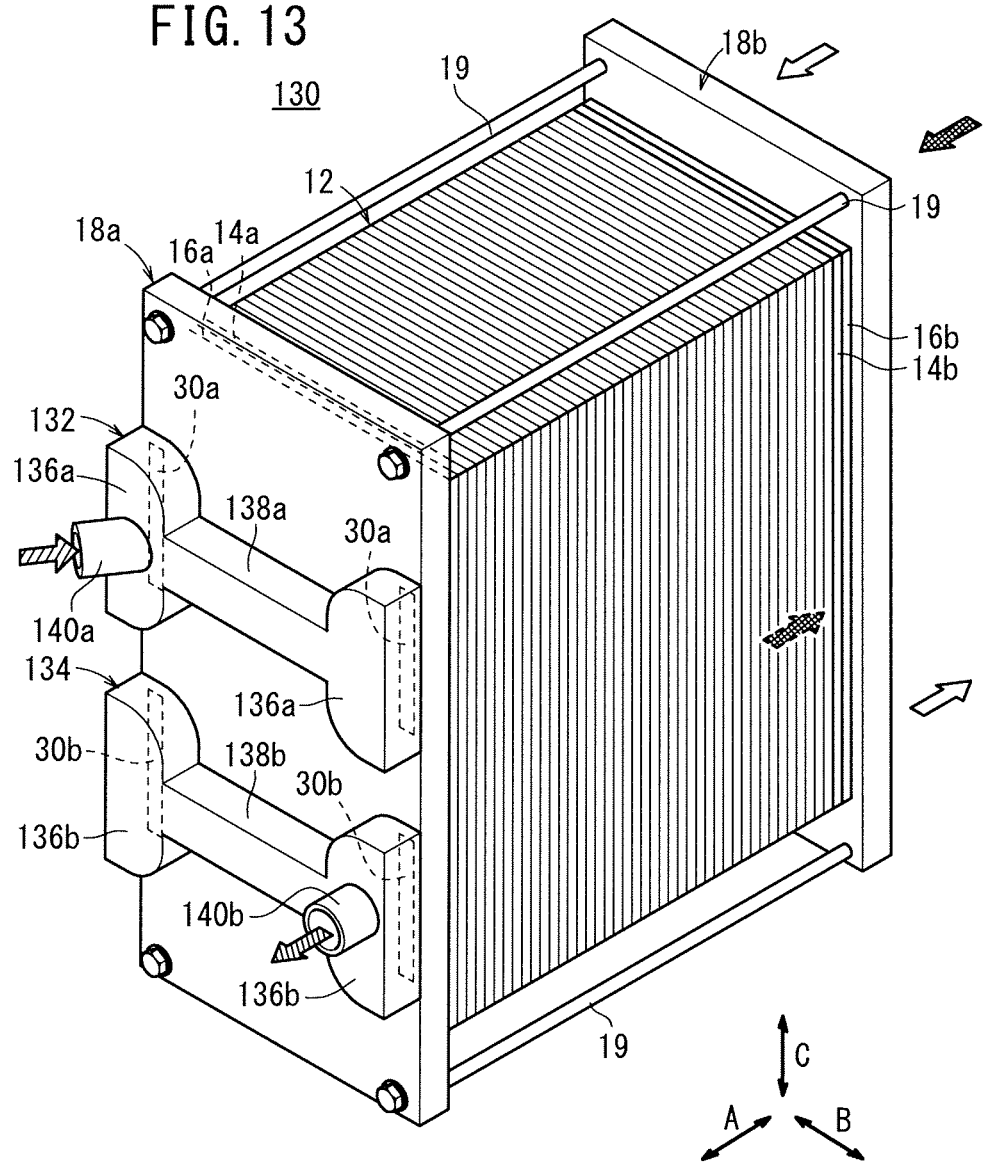
FIG. 13 is a view schematically showing a fuel cell stack according to a fifth embodiment of the present invention.

FIG. 13 is a perspective view showing a fuel cell stack 130 according to a fifth embodiment of the present invention.

The fuel cell stack 130 includes a coolant supply manifold 132 and a coolant discharge manifold 134 provided on the outer surface of the first end plate 18a. Each of the coolant supply manifold 132 and the coolant discharge manifold 134 has a substantially H-shape.

The coolant supply manifold 132 includes a pair of longitudinally elongated supply manifold sections 136a and a supply coupling section 138a coupling substantially central portions of the pair of supply manifold sections 136a together. The pair of supply manifold sections 136a communicate with the pair of coolant supply passages 30a of the first end plate 18a. The width of the supply coupling section 138a in the longitudinal direction of the first end plate 18a indicated by the arrow C is smaller than the size of the pair of supply manifold sections 136a in the longitudinal direction. A coolant supply pipe 140a extending to the outside of the first end plate 18a is provided on one of the supply manifold sections 136a.

The coolant supply pipe 140a is connected to a central portion of one of the supply manifold sections 136a with inclination from the stacking direction toward the outwardly horizontal direction (the side opposite to the supply coupling section 138a). The coolant supply pipe 140a supplies the coolant into the one of the supply manifold sections 136a obliquely from the side.

Figure 14:
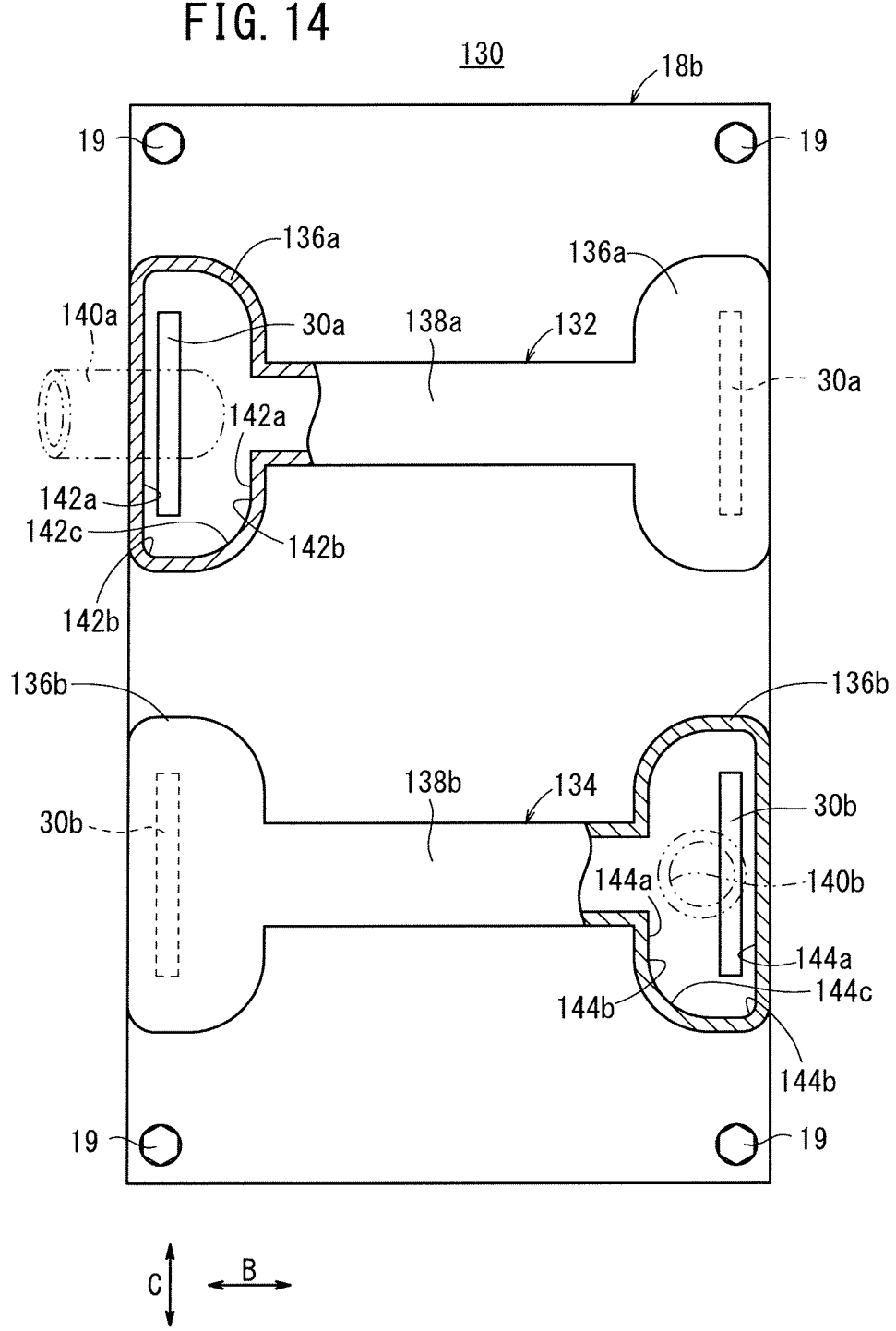
FIG. 14 is a front view showing the fuel cell stack.

As shown in FIG. 14, an inclined portion 142c inclined smoothly from a straight portion 142a to a curved portion 142b is provided on the inner wall surface of the supply manifold section 136a. The coolant supply passage 30a is off-centered toward the outside in the supply manifold section 136a, and the inclined portion 142c is provided at each of upper and lower inner corners of the inner wall surface of the supply manifold section 136a (i.e., both of upper and lower corners facing the other supply manifold section 136a). Preferably, the inclined portions 142c are provided on the inner wall surface of at least one of the supply manifold sections 136a to which the coolant supply pipe 140a is coupled.

As shown in FIGS. 13 and 14, the coolant discharge manifold 134 includes a pair of discharge manifold sections 136b and a discharge coupling section 138b coupling substantially central portions of the pair of discharge manifold sections 136b together. The pair of discharge manifold sections 136b communicate with the pair of coolant discharge passages 30b of the first end plate 18a. The width of the discharge coupling section 138b in the longitudinal direction of the first end plate 18a indicated by the arrow C is smaller than the size of the pair of discharge manifold sections 136b in the longitudinal direction.

A coolant discharge pipe 140b extending to the outside of the first end plate 18a is provided on the discharge manifold section 136b at a diagonal position of the coolant supply pipe 140a. The coolant discharge pipe 140b extends in the horizontal direction (stacking direction) from a central (or upper or lower) portion of the one of the discharge manifold sections 136b.

As shown in FIG. 14, an inclined portion 144c is provided on the inner wall surface of the discharge manifold section 136b. The inclined portion 144c is inclined smoothly from a straight portion 144a to a curved portion 144b. The coolant discharge passage 30b is off-centered toward the outside in the discharge manifold section 136b. The inclined portion 144c is provided at each of upper and lower inner corners of the inner wall surface of the discharge manifold section 136b (i.e., both of upper and lower corners facing the other discharge manifold section 136b). Preferably, the inclined portions 144c are provided on the inner wall surface of at least one of the discharge manifold sections 136b to which the coolant discharge pipe 140b is coupled.

In the fifth embodiment, as shown in FIG. 14, the coolant supply pipe 140a is coupled to a central portion of one of the supply manifold sections 136a, and the inclined portion 142c is provided at each of the upper and lower inner corners of the inner wall surface of the one supply manifold section 136a.

Thus, pressure loss of the coolant flowing inside the one of the supply manifold sections 136a is reduced as much as possible, and the coolant is distributed to the pair of coolant supply passages 30a suitably. With such a simple structure, the same advantages as in the case of the fourth embodiment are obtained. For example, the coolant is supplied to the fuel cells smoothly and uniformly.

Figure 15:
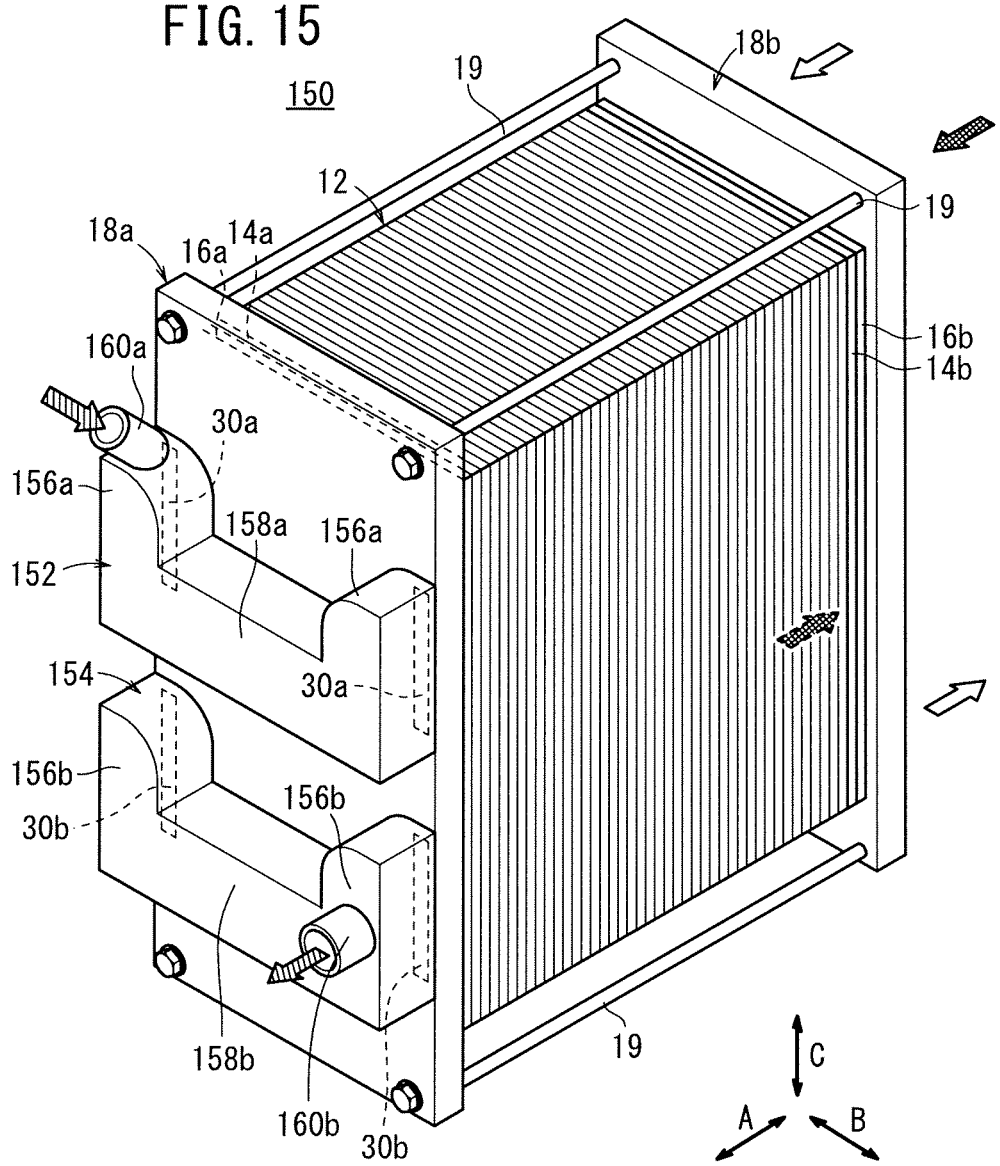
FIG. 15 is a perspective view schematically showing a fuel cell stack according to a sixth embodiment of the present invention.

FIG. 15 is a perspective view schematically showing a fuel cell stack 150 according to a sixth embodiment of the present invention.

The fuel cell stack 150 has a coolant supply manifold 152 and a coolant discharge manifold 154 provided on the outer surface of the first end plate 18a. Each of the coolant supply manifold 152 and the coolant discharge manifold 154 has a substantially U-shape which is opened upward.

The coolant supply manifold 152 includes a pair of longitudinally elongated supply manifold sections 156a and a supply coupling section 158a coupling lower portions of the pair of supply manifold sections 156a together. The pair of supply manifold sections 156a communicate with the pair of coolant supply passages 30a of the first end plate 18a. The width of the supply coupling section 158a in the longitudinal direction of the first end plate 18a indicated by the arrow C is smaller than the size of the pair of supply manifold sections 156a in the longitudinal direction. A coolant supply pipe 160a extending to the outside of the first end plate 18a is provided separately (or integrally) on one of the supply manifold sections 156a.

The coolant supply pipe 160a is connected to an upper end of one of the supply manifold sections 156a with an inclination from a vertical direction toward a horizontal direction. The coolant supply pipe 160a supplies the coolant into the one of the supply manifold sections 156a obliquely from above.

As shown in FIG. 16, the inner wall surface of the supply manifold section 156a includes an inclined portion 162c inclined smoothly from a straight portion 162a through a curved portion 162b. The coolant supply passage 30a is off-centered toward the outside in the supply manifold section 156a, and the inclined portion 162c is provided at an upper inner corner of the inner wall surface of the supply manifold section 156a (i.e., a corner facing the other supply manifold section 156a). Preferably, the inclined portion 162c is provided on the inner wall surface of at least one of the supply manifold sections 116a to which the coolant supply pipe 160a is coupled.

As shown in FIGS. 15 and 16, the coolant discharge manifold 154 includes a pair of discharge manifold sections 156b and a discharge coupling section 158b coupling lower portions of the pair of discharge manifold sections 156b together. The pair of discharge manifold sections 156b communicate with the pair of coolant discharge passages 30b of the first end plate 18a. The width of the discharge coupling section 158b in the longitudinal direction of the first end plate 18a is smaller than the size of the pair of discharge manifold sections 156b in the longitudinal direction.

A coolant discharge pipe 160b extending to the outside of the first end plate 18a is provided on the discharge manifold section 156b at a diagonal position of the coolant supply pipe 160a. The coolant discharge pipe 160b extends in the horizontal direction (stacking direction) from the central portion of the one of the discharge manifold sections 156b.

As shown in FIG. 16, an inclined portion 164c is provided on the inner wall surface of the discharge manifold section 156b. The inclined portion 164c is inclined smoothly from a straight portion 164a to a curved portion 164b. The coolant discharge passage 30b is off-centered toward the outside in the discharge manifold section 156b. The inclined portion 164c is provided at an upper inner corner of the inner wall surface of the discharge manifold section 156b (i.e., a corner facing the other discharge manifold section 156b). Preferably, the inclined portion 164c is provided on the inner wall surface of at least one of the discharge manifold sections 156b to which the coolant discharge pipe 160b is coupled.

In the sixth embodiment, the coolant supply pipe 160a is connected to the upper position of one of the supply manifold sections 156a, and the inclined portion 162c is provided at the upper inner corner of the inner wall surface of the one supply manifold section 156a.

Thus, the pressure loss of the coolant flowing inside the supply manifold section 156a is reduced as much as possible. Further, the coolant is distributed to the pair of the coolant supply passages 30a suitably. With the simple structure, the same advantages as in the case of the fourth and fifth embodiments are obtained. For example, the coolant can be supplied to the fuel cells smoothly and uniformly.

FIG. 17 is a perspective view schematically showing a fuel cell stack 170 according to a seventh embodiment of the present invention.

The fuel cell stack 170 includes a coolant supply manifold 172 and a coolant discharge manifold 174 respectively at upper and lower positions on the outer surface of the first end plate 18a.

The coolant supply manifold 172 includes a pair of supply manifold sections 176a and a supply coupling section 178a coupling upper portions of the pair of supply manifold sections 176a together. The pair of supply manifold sections 176a communicate with the pair of coolant supply passages 30a of the first end plate 18a.

The supply manifold sections 176a have a rectangular parallelepiped shape elongated in the longitudinal direction along the long sides of the first end plate 18a indicated by the arrow C. A coolant supply pipe 120a extending to the outside of the first end plate 18a is provided on one of the supply manifold sections 176a.

An inclined portion 180c is provided on the inner wall surface of the supply manifold section 176a. The inclined portion 180c is inclined smoothly from a straight portion 180a through a curved portion 180b. The coolant supply passage 30a is off-centered toward the inside of the supply manifold section 176a. The inclined portion 180c is provided at a lower outer corner of the inner wall surface of the supply manifold section 176a. Preferably, the inclined portion 180c is provided on the inner wall surface of at least one of the supply manifold sections 176a to which the coolant supply pipe 120a is coupled.

The coolant discharge manifold 174 includes a pair of discharge manifold sections 176b and a discharge coupling section 178b coupling upper portions of the pair of discharge manifold sections 176b together. The pair of discharge manifold sections 176b communicate with the pair of coolant discharge passages 30b of the first end plate 18a.

The discharge manifold sections 176b have a rectangular parallelepiped shape elongated in the longitudinal direction along the long sides of the first end plate 18a indicated by the arrow C. A coolant discharge pipe 120b extending to the outside of the first end plate 18a is provided on one of the discharge manifold sections 176b that is located at a diagonal position of the one of the supply manifold sections 176a.

An inclined portion 182c is provided in the inner wall surface of the discharge manifold section 176b. The inclined portion 182c is inclined smoothly from a straight portion 182a through a curved portion 182b. The coolant discharge passage 30b is off-centered toward the inside of the discharge manifold section 176b. The inclined portion 182c is provided at a lower outer corner of the inner wall surface of the discharge manifold section 176b. Preferably, the inclined portion 182c is provided on the inner wall surface of at least one of the discharge manifold sections 176b to which the coolant discharge pipe 120b is coupled.

In the seventh embodiment, the inclined portion 180c is provided on the inner wall surface of the supply manifold section 176a. The inclined portion 180c is inclined smoothly from the straight portion 180a through the curved portion 180b. The coolant supply passage 30a is off-centered toward the inside of the supply manifold section 176a, and the inclined portion 180c is provided at the lower outer corner of the inner wall surface of the supply manifold section 176a.

Thus, the pressure loss of the coolant flowing inside the supply manifold section 176a is reduced as much as possible. Further, the coolant is distributed to the pair of coolant supply passages 30a suitably. With the simple structure, the same advantages as in the case of the fourth to sixth embodiments are obtained. For example, the coolant can be supplied to the fuel cells smoothly and uniformly.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell stack formed by stacking an electrolyte electrode assembly and a separator in a stacking direction, the electrolyte electrode assembly including a pair of electrodes and an electrolyte interposed between the electrodes, rectangular end plates being provided at both ends of the fuel cell stack in the stacking direction, a pair of coolant supply passages and a pair of coolant discharge passages extending through two opposite long sides of the fuel cell stack in the stacking direction as passages for conducting a coolant therethrough;
   one of the end plates having a pair of short sides and a pair of long sides, and comprising:
   a pair of supply manifold sections communicating with the pair of the coolant supply passages and elongated along two sides of the end plate, each of the supply manifold sections including a portion which extends in a direction substantially parallel to the long sides of the end plate, the supply manifold sections being spaced apart from one another; and
   a supply coupling section for fluidly interconnecting the supply manifold sections and coupling the pair of supply manifold sections together, the coupling section extending in a direction substantially parallel to the short sides of the end plate;
   wherein a coolant supply pipe is coupled to one of the pair of supply manifold sections, said coolant supply pipe extending in a direction inclined at an angle which is in a range between 10 and 40 degrees, in relation to a line extending parallel to the long sides of the end plate.

2. The fuel cell stack according to claim 1, wherein
the pair of supply manifold sections are elongated in a vertical direction;
the supply coupling section is coupled to upper portions of the pair of supply manifold sections; and
an end of the coolant supply pipe is coupled to a lower end of the one of the supply manifold sections, and the coolant supply pipe is inclined from the vertical direction toward a horizontal direction thereby to supply the coolant into the one of the supply manifold sections obliquely from below.

3. The fuel cell stack according to claim 1, wherein
the pair of supply manifold sections are elongated in a vertical direction;
the supply coupling section is coupled to lower portions of the pair of supply manifold sections; and
an end of the coolant supply pipe is coupled to an upper end of the one of the supply manifold sections, and the coolant supply pipe is inclined from the vertical direction toward a horizontal direction thereby to supply the coolant into the one of the supply manifold sections obliquely from above.

4. The fuel cell stack according to claim 1, wherein
the pair of supply manifold sections are elongated in a vertical direction;
the supply coupling section is coupled to central portions of the pair of supply manifold sections; and
an end of the coolant supply pipe is coupled to a central portion of the one of the supply manifold sections, and the coolant supply pipe is inclined from the stacking direction toward an outwardly horizontal direction thereby to supply the coolant into the one of the supply manifold sections obliquely from a side.

5. The fuel cell stack according to claim 1, wherein
the one of the end plates comprises a pair of discharge manifold sections communicating with the coolant discharge passages; and a discharge coupling section for coupling the pair of discharge manifold sections together;
wherein a coolant discharge pipe extending in the stacking direction is coupled to one of the discharge manifold sections.

6. A fuel cell stack formed by stacking an electrolyte electrode assembly and a separator in a stacking direction, the electrolyte electrode assembly including a pair of electrodes and an electrolyte interposed between the electrodes, rectangular end plates being provided at both ends of the fuel cell stack in the stacking direction, a pair of coolant supply passages and a pair of coolant discharge passages extending through two opposite long sides of the fuel cell stack in the stacking direction as passages for conducting a coolant therethrough;
one of the end plates having a pair of short sides and a pair of long sides, and comprising:
a pair of supply manifold sections communicating with the pair of the coolant supply passages and elongated along two sides of the end plate, each of the pair of supply manifold sections including a portion which extends in a first direction substantially parallel to the long sides of the end plate, the supply manifold sections being spaced apart from one another;
a supply coupling section for fluidly interconnecting the supply manifold sections and coupling the pair of supply manifold sections together, the supply coupling section extending in a direction substantially parallel to the short sides of the end plate;
a pair of discharge manifold sections communicating with the coolant discharge passages and elongated along the two sides, the discharge manifold sections being spaced apart from one another, each of discharge manifold sections being elongated in the first direction; and
a discharge coupling section for interconnecting the discharge manifold sections and coupling the pair of discharge manifold sections together,
wherein:
a coolant supply pipe is coupled to one of the pair of supply manifold sections, said coolant supply pipe extending in a direction which is inclined at an angle between 10 and 40 degrees in relation to the first direction, and
a coolant discharge pipe is coupled to one of the discharge manifold sections, the coolant discharge pipe extending in the stacking direction.

7. The fuel cell stack according to claim 6, wherein
the pair of supply manifold sections are elongated in a vertical direction;
the supply coupling section is coupled to upper portions of the pair of supply manifold sections; and
an end of the coolant supply pipe is coupled to a lower end of the one of the supply manifold sections, and the coolant supply pipe is inclined from the vertical direction toward a horizontal direction thereby to supply the coolant into the one of the supply manifold sections obliquely from below.

8. The fuel cell stack according to claim 6, wherein
the pair of supply manifold sections are elongated in a vertical direction;
the supply coupling section is coupled to lower portions of the pair of supply manifold sections; and
an end of the coolant supply pipe is coupled to an upper end of the one of the supply manifold sections, and the coolant supply pipe is inclined from the vertical direction toward a horizontal direction thereby to supply the coolant into the one of the supply manifold sections obliquely from above.

9. The fuel cell stack according to claim 6, wherein
the pair of supply manifold sections are elongated in a vertical direction;
the supply coupling section is coupled to central portions of the pair of supply manifold sections; and
an end of the coolant supply pipe is coupled to a central portion of the one of the supply manifold sections, and the coolant supply pipe is inclined from the stacking direction toward an outwardly horizontal direction thereby to supply the coolant into the one of the supply manifold sections obliquely from a side.

10. The fuel cell stack according to claim 6, wherein:
a cross section of the supply coupling section is substantially rectangular,
a width of the supply coupling section in a longitudinal direction is smaller than a size of the pair of supply manifold sections in a longitudinal direction,
a cross section of the discharge coupling section is substantially rectangular, and
a width of the discharge coupling section in the longitudinal direction is smaller than a size of the pair of discharge manifold sections in the longitudinal direction.

* * * * *